Nov. 13, 1951     E. A. LINKE     2,575,115
TIE-MEMBER FOR THE COIL WINDINGS OF
DYNAMOELECTRIC MACHINES
Filed Dec. 24, 1949

Inventor:
Ernest A. Linke,
by Ernest C. Britton
His Attorney.

Patented Nov. 13, 1951

2,575,115

UNITED STATES PATENT OFFICE 2,575,115

TIE MEMBER FOR THE COIL WINDINGS OF DYNAMOELECTRIC MACHINES

Ernest A. Linke, Ridgewood, N. J., assignor to General Electric Company, a corporation of New York Application December 24, 1949, Serial No. 134,922

2 Claims. (Cl. 171—252)

My invention relates to dynamoelectric machines and more particularly to an improved tie-member for the windings of such machines.

The windings of fractional horsepower dynamoelectric machines generally comprise a multiplicity of coils of relatively fine wire having dimensions such that the coils are non-rigid in character. The windings are placed in longitudinal slots in the magnetizable frame of the machine, portions of the windings lying within separate slots and end portions or end turns lying outside the slots, joining the portions within the slots. In most fractional horsepower machines these end turns may be quite long and therefore vulnerable to such vibratory forces as the machine may experience in operation. If the end turns are free to vibrate the entire winding may become dislodged or individual conductors caused to break, either event interfering with the efficiency of the machine. In extreme cases necessary clearances between relatively rotating parts of the machine may not be maintained, causing ultimate destruction of the machine.

Accordingly, it is an object of my invention to provide a dynamoelectric machine embodying an improved end turn support.

Another object of my invention is to provide an end turn support which may be independent of the size of the slots in which the windings are placed.

A further object of my invention is to provide an end turn support which materially reduces the assembly time of such machines.

Briefly, in accordance with my invention the windings of a dynamoelectric machine are provided with a U-shaped tie member formed of insulated wire. The tie-member is considerably longer than the slots into which it is placed and its protruding end portions are formed as loops which partially encircle the end turns of the windings which the tie-member overlies. The bend portion of the U prevents rotation of the leg portions in the slots enabling the encircling loops to maintain a secure grip upon the end turns, quite independently of the fit between the leg portions of the tie-member and the winding slots. The thickness of the wire of which the tie-member is formed may therefore be less than the width of the longitudinal slot openings, permitting installation directly through those openings rather than through the end openings of the slots, effectively reducing the assembly time of the machine.

Figure 1:
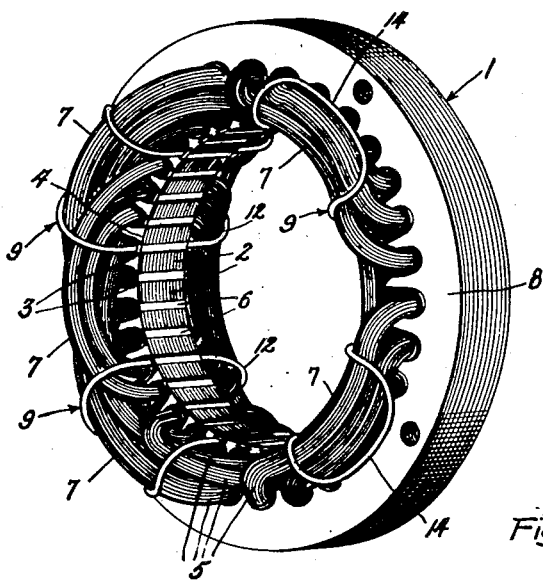
Figure 2:
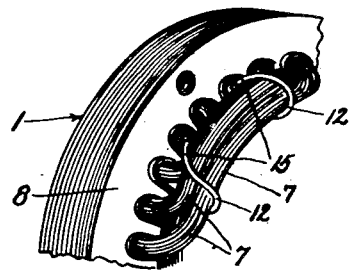
Figure 3:
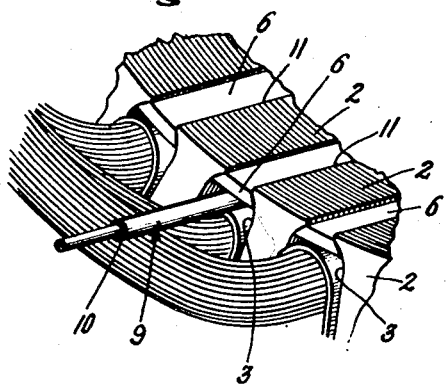
Figure 5:
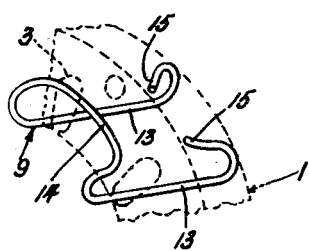
Figure 4:
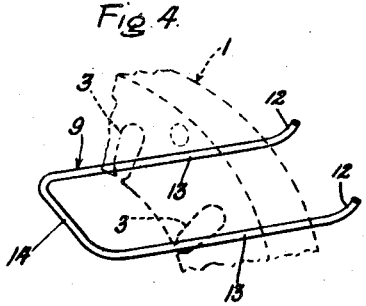

Further objects and advantages of my invention will become apparent and my invention will be better understood from the following detailed description taken in conjunction with the drawing in which Fig. 1 is a perspective view of one end of the stator frame of a dynamoelectric machine showing my improved tie-member in position about the windings. Fig. 2 is a similar perspective view of the opposite end of the stator frame. Fig. 3 is an enlarged segment of Fig. 1 showing the relationship of an individual slot, the winding in that slot, the slot wedge and the slot engaging portion of my improved tie-member. Fig. 4 is a simplified perspective view omitting the windings and slot wedges but showing the supporting tie-member in assembled position in the winding slots before formed about the winding end turns. Fig. 5 is a similar simplified view showing the tie-member in assembled position after being formed about the end turns in supporting position.

Referring now to the drawings, there is shown in Figs. 1 and 2 a portion of the stationary element or stator of a dynamoelectric machine having a core 1 which may be of standard laminated construction or any other construction suitable to the purposes of the machine. Projecting radially inwardly from the core 1 is a plurality of teeth 2 forming coil winding slots 3 therebetween. Disposed about the inner periphery 4 of the core 1 are a number of coil windings 5 which, when energized, determine the location of magnetic poles within the magnetizable core 1. The windings 5 are partially enclosed within the winding slots 3 and are imprisoned within the slots by slot wedges 6 as will be readily appreciated by reference to Fig. 3. The slot wedges 6 may be formed of any suitable insulating material and are emplaced by being driven longitudinally into the slots, exerting a cramping action upon the coil windings therein contained to maintain the windings in place.

The end turns 7 of the windings 5 necessarily project axially beyond the end faces 8 of the core 1. In most fractional horsepower machines these end turns represent relatively long spans which, if left unsupported, are subject to damage by vibration to which this general class of machine is invariably subjected. In accordance with my invention therefore, I provide an end turn support or tie-member 9. This support or tie-member is generally U-shaped and may be formed of electrically insulated wire having any desired cross-section. The insulating coating 10 may be any suitable insulating material. While I have illustrated my support or tie-member as having a circular cross-section, it will be understood that insulated wire having any other geometric cross-section such for example, as square or hexagonal, is equally suited to the purpose. The thickness of the wire should be less than the width of the mouths 11 of the winding slots 3 so that the slot-engaging portions of the support or tie-member may be inserted radially into the slots rather than longitudinally into the end opening of the slots as would otherwise be required, thus reducing the time required to assemble the machine.

Prior to assembly to the machine, the support or tie-member 9 is preformed in the shape of a U, the free ends of which are upturned to form toes 12. In this form the support is assembled with the core 1 and the windings 5 by placing the leg portions of the U into the slots in a position overlying the preassembled windings, and with the preformed toes 12 directed outwardly away from the center of the core 1. The slot wedges 6 are then driven into place imprisoning the coil windings and the overlying leg portions 13 of the support or tie-member within the winding slots. The protruding band portion 14 and the free ends of the support or tie-member are then formed outwardly around the end turns 7 to gird them tightly in supporting position. In the forming operation the preformed toes 12 of the free ends of the support are depressed slightly toward one another and, like the extremity of the bend portion 14, ultimately occupy a position between the end turns of the innermost winding and the end faces 8 of the magnetizable core 1. It may be seen from Figs. 1, 2 and 5 that the completely assembled and finally formed support or tie-member exerts its restraining action by partially encircling the end turns 7 with bight portions 15 tensioned about the end turns. These bight portions are maintained tightly about the end turns by the inherent rigidity of the wire constituting the support or tie-member. The bend portion 14 of the U-shaped member 9 precludes the possibility that the bight portions 15 might be disengaged from the end turns 7 by rotation of the leg portions 13 of the support member within the slot. Thus the effectiveness of the restraint upon the end turns is made independent of the fit of the slot-engaging leg portions 13 within the winding slots 3. The thickness of the wire forming the support may therefore be less than the width of the slot mouths 11, reducing the assembly time and therefore the assembly cost, by permitting insertion of the tie-members directly through the slot mouths.

Having illustrated and described my invention I intend in the appended claims to cover all modifications which do not depart from the spirit and scope of the invention.

What I claim as new and desire to secure by Letters Patent of the United States is:

1. A dynamoelectric machine member having a plurality of winding slots formed therein, a plurality of windings positioned in said slots, a plurality of U-shaped wire tie members having legs each overlying windings in separate slots and having portions extending beyond said slots adapted to be formed around the end turns of said windings outside of said slots for securely holding said end turns in place, and a plurality of slot wedge means to retain said windings and tie members in said slots.

2. A dynamoelectric machine member having a plurality of winding slots formed therein, windings positioned in said slots, and a U-shaped tie member formed of insulated wire having its legs respectively positioned in two of said slots overlaying said winding with the ends of said legs respectively extending beyond said slots on one side of said member and the portion connecting said legs extending beyond said slots on the other side of said member, said ends of said legs respectively forming bight portions girding the end turns of said winding on said one side of said member, said connecting portion of said tie-member girding the end turns of said winding on the other side of said core member.

ERNEST A. LINKE.

REFERENCES CITED

The following references are of record in the file of this patent:

UNITED STATES PATENTS

| Number | Name | Date |
|---|---|---|
| 669,470 | Shuster | Mar. 5, 1901 |
| 1,507,170 | Gunn | Sept. 2, 1924 |
| 2,465,820 | Sharrow et al. | Mar. 29, 1949 |